June 6, 1967 J. L. MYERS 3,324,372
MOTOR SPEED CONTROL CIRCUIT
Filed July 10, 1964
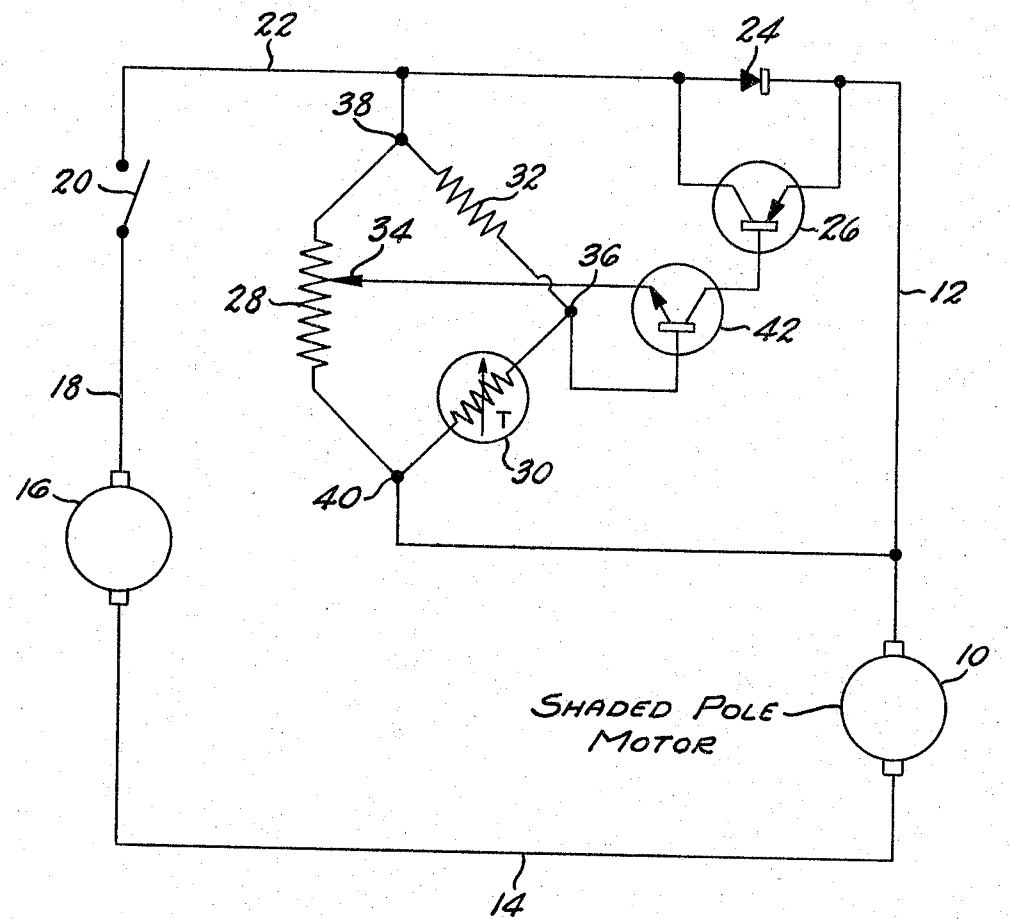
INVENTOR.
JOHN L. MYERS
BY C. R. Meland
HIS ATTORNEY United States Patent Office 3,324,372

Patented June 6, 1967

3,324,372

MOTOR SPEED CONTROL CIRCUIT

John L. Myers, Dayton, Ohio, assignor to General Motors Corporation, Detroit, Mich., a corporation of Delaware Filed July 10, 1964, Ser. No. 381,667
4 Claims. (Cl. 318—227)

This invention relates to a motor control system for an induction motor and more particularly to a motor control system which is capable of varying the speed of an induction motor such as a shaded pole motor by varying the relative magnitudes of alternating and direct current applied to the winding of the motor.

One known method of controlling the speed of an induction motor such as a shaded pole motor is to vary the direct current component supplied to the motor coil. This is illustrated in the patents to Schweitzer, Jr., 2,304,-604, Williams, 2,510,536 and Williams, 2,419,431. In the Williams patent, 2,419,431, the coil winding of the motor is supplied by a source of alternating current through a circuit that includes a parallel-connected resistor and diode. By varying the resistance of the resistor, it is possible to vary the direct current component of the current supplied to the motor winding. The direct current component is effective to produce a resisting or braking torque which slows down the motor and it therefore is possible to control motor speed by varying the resistance in the Williams patent to therefore vary the relative magnitude of the average and effective voltage which is applied to the motor.

In contrast to the motor control system shown in the Williams patent, 2,419,431, it is an object of this invention to provide a motor control system wherein the circuit that connects the motor and the source of AC voltage includes a parallel connected transistor and diode. The transistor and diode are poled to conduct current in opposite directions and a control circuit is provided for controlling the conduction of the transistor between saturation and its high impedance condition.

Another object of this invention is to provide a temperature controlled motor control system for an induction motor such as a shaded pole motor wherein the voltage that is applied to the motor is controlled by a parallel connected transistor and diode and wherein the conduction of the transistor is controlled in response to a temperature condition sensed by a control circuit.

Further objects and advantages of the present invention will be apparent from the following description, reference being had to the accompanying drawings wherein preferred embodiments of the present invention are clearly shown.

In the drawing:

The single figure drawing is a schematic circuit diagram of a motor control system made in accordance with this invention.

Referring now to the drawing, the reference numeral 10 designates a shaded pole induction motor. This shaded pole motor is of a conventional type that has a rotor and a fixed salient pole type of field winding. Each of the poles can carry a copper strap which forms the shading coils for the motor.

The motor 10 is connected with conductors 12 and 14, the conductor 14 being connected to one side of a source of alternating current 16. The opposite side of the source of alternating current 16 is connected with a conductor 18 and this conductor is connected with a manually operable control switch 20. The opposite side of the control switch 20 is connected with a power supply conductor 22 and when switch 20 is closed, the voltage of source 16 is applied across conductors 14 and 22.

A diode 24 is connected between the conductors 22 and 12 and is seen that this diode is connected in parallel with a PNP transistor 26. The emitter of transistor 26 is connected with the cathode of diode 24 whereas the collector of transistor 26 is connected with the anode of diode 24.

The conduction of transistor 26 is controlled by a temperature sensitive bridge which includes a potentiometer resistor 28, a thermistor 30, and a resistor 32. The wiper 34 of resistor 28 and the junction 36 form the output terminals of the bridge. The input terminals of the temperature sensitive bridge are designated by reference numerals 38 and 40, the terminal 38 being connected with conductor 22 and the terminal 40 being connected with conductor 12. The output terminals of the temperature sensitive bridge 34 and 36 are connected respectively with the emitter and base electrodes of an NPN transistor 42. The collector of transistor 42 is connected with the base of transistor 26.

Although the motor control system of this invention can be used in a wide variety of applications, it has particular utility in controlling the speed of the motor where the motor drives a fan for circulating the air within the food compartment of a refrigerator. In such an arrangement, the thermistor 30 can be used to sense the temperature of the food compartment and vary the motor fan speed accordingly.

In explaining the operation of this system, it will be appreciated that the direct current component applied to the motor 10 can be controlled by varying the conduction of transistor 26. It will also be appreciated that when conductor 22 is positive and conductor 14 negative, the diode 24 will freely conduct in its forward direction to apply a half cycle of voltage to the motor 10. When conductor 14 is positive and conductor 22 is negative, the diode 24 will block current flow through the motor 10 but the transistor 26 will now permit current to flow around the diode 24 and the amount of current flow on the other half cycle of applied alternating current will depend upon the conduction of transistor 26. It therefore is seen that the direct current component supplied to the motor 10 will be varied as the conduction of transistor 26 is varied to provide for a varying motor speed.

The conduction of transistor 26 will depend upon the conduction of transistor 42. The conduction of transistor 42 is controlled by the voltage applied between its base and emitter electrodes. When the base of transistor 42 is positive with respect to its emitter, the transistor 42 conducts causing the transistor 26 to conduct.

The conduction of transistor 26 can be varied between saturation and its high impedance condition. When transistor 26 is saturated, the direct current component applied to the motor 10 will be substantially zero and the motor will therefore run at top speed. As the conduction of transistor 42 is reduced, the speed of the motor is also reduced since the direct current component is increased.

The approximate maximum impedance of the circuit in parallel with the diode 24 will be the resistance of the temperature sensitive bridge when the transistor 26 is fully nonconductive. The minimum impedance of the circuit will be the saturation resistance of the transistor 26 when it is biased to its fully conductive condition by the transistor 42.

The conduction of transistor 42 is dependent upon the relative potentials of junctions 34 and 36 and when these potentials are equal, the transistor 42 is nonconductive which in turn cuts off the conduction of transistor 26 to bring about the high impedance condition. As the temperature sensitive bridge becomes unbalanced, the potential of junction 36 will exceed the potential of junction 34 to turn on transistors 42 and 26. At some point, the relative potentials of junctions 36 and 34 will be such as to saturate the transistor 26 so as to provide the maximum speed for the motor 10.

While the embodiments of the present invention as herein disclosed, constitute a preferred form, it is to be understood that other forms might be adopted.

What is claimed is as follows:

1. A temperature responsive motor speed control system for a shaded pole induction motor comprising, an input terminal adapted to be connected with a source of alternating current, an output terminal adapted to be connected with a shaded pole induction motor, a diode connected between said input and output terminals, a transistor connected in parallel with said diode, said diode and transistor being poled such that current can flow in opposite directions between said input terminal and said output terminal on alternate half cycles of applied alternating current, a temperature sensitive bridge network, said bridge network having input terminals connected between said input terminal and said output terminal, a second transistor having emitter, collector and base electrodes, means connecting one of said emitter and collector electrodes of said second transistor with the base electrode of said first transistor, and means connecting the output terminals of said temperature sensitive bridge across the base electrode and one of the emitter and collector electrodes of said second transistor.

2. The motor controller according to claim 1 where the temperature sensitive bridge includes a thermistor.

3. A temperature responsive motor speed control system comprising, a source of alternating current, a shaded pole induction motor, a circuit connecting a first side of said induction motor with a first side of said source, said last-named circuit including a diode, a transistor connected across said diode, said transistor and diode being poled to conduct current in opposite directions between said source of alternating current and said motor, a temperature sensitive bridge circuit haivng input terminals and output terminals, said input terminals of said bridge circuit being connected in parallel with said transistor and diode, and means for controlling the conduction of said transistor in response to the voltage appearing across the output terminals of said bridge network.

4. The motor control system according to claim 3 wherein a second transistor is provided having input terminals connected with the output terminals of the bridge network and having an output terminal connected with the base of the transistor that is connected across the diode.

References Cited

UNITED STATES PATENTS

| | | | |
|---|---|---|---|
| 2,722,649 | 11/1955 | Immel et al. | 318—227 X |
| 2,981,879 | 4/1961 | Taylor et al. | 318—331 X |
| 3,057,557 | 10/1962 | Guyton et al. | 318—334 X |
| 3,189,810 | 6/1965 | MacGregor | 318—227 |

OTHER REFERENCES

Application Note, page 11, General Electric, 3–1962.

ORIS L. RADER, *Primary Examiner.*

G. Z. RUBINSON, *Assistant Examiner.*